(12) United States Patent
Noh et al.

(10) Patent No.: US 8,114,805 B2
(45) Date of Patent: Feb. 14, 2012

(54) METHOD OF PREPARING HETEROPOLY ACID CATALYST

(75) Inventors: Hyun-Kuk Noh, Daejeon (KR); Hyun-jong Shin, Gwangju (KR); Won-ho Lee, Daejeon (KR); Byung-yul Choi, Naju-si (KR); Gyo-hyun Hwang, Daejeon (KR); Ju-yeon Park, Gwangju (KR); Duk-ki Kim, Gwangju (KR); Young-hyun Choe, Naju-si (KR); Min-ho Kil, Daejeon (KR); Min-suk Kim, Daejeon (KR); Young-jin Cho, Naju-si (KR); Sung-chul Lim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 14 days.

(21) Appl. No.: 12/664,584

(22) PCT Filed: Jun. 13, 2008

(86) PCT No.: PCT/KR2008/003313
§ 371 (c)(1),
(2), (4) Date: Apr. 1, 2010

(87) PCT Pub. No.: WO2008/153341
PCT Pub. Date: Dec. 18, 2008

(65) Prior Publication Data
US 2010/0184591 A1   Jul. 22, 2010

(30) Foreign Application Priority Data
Jun. 13, 2007   (KR) .................. 10-2007-0057760

(51) Int. Cl.
*B01J 27/00*  (2006.01)
*B01J 27/198*  (2006.01)
*B01J 27/188*  (2006.01)
*B01J 27/19*  (2006.01)
*B01J 27/192*  (2006.01)
*B01J 27/185*  (2006.01)
*B01J 23/00*  (2006.01)

(52) U.S. Cl. ........ 502/208; 502/209; 502/210; 502/211; 502/212; 502/213; 502/302; 502/305; 502/308; 502/311; 502/313; 502/318; 502/321

(58) Field of Classification Search .......... 502/208–213, 502/305–355
See application file for complete search history.

(56) References Cited

U.S. PATENT DOCUMENTS
4,272,637 A * 6/1981 Yamamoto et al. .......... 568/780
(Continued)

FOREIGN PATENT DOCUMENTS
JP   2000-296336   * 10/2000
(Continued)

OTHER PUBLICATIONS

Chinese Office Action issued in corresponding Chinese patent application 200880009587.5 on Feb. 21, 2011 along with English translation, 10 pages.

*Primary Examiner* — Patricia L Hailey
(74) *Attorney, Agent, or Firm* — Rothwell, Figg, Ernst & Manbeck, P.C.

(57) ABSTRACT

The present invention relates to a method of preparing a heteropoly acid catalyst used for the production of methacrylic acid by gas phase oxidation of methacrolein, more precisely a method of preparing a heteropoly acid catalyst comprising the steps of preparing a slurry by adding metal precursors and ammonium salt to protonic acid Keggin-type heteropoly acid aqueous solution and stirring thereof; and drying, molding and firing the slurry to give a catalyst. The present invention provides a method of preparing a heteropoly acid catalyst exhibiting high methacrolein conversion rate and methacrylic acid selectivity without pre-firing process by using high purity protonic acid Keggin-type heteropoly acid and ammonium salt.

11 Claims, 1 Drawing Sheet

U.S. PATENT DOCUMENTS

| | | | | |
|---|---|---|---|---|
| 4,307,247 | A * | 12/1981 | Shaw et al. | 562/599 |
| 4,564,607 | A * | 1/1986 | Yoneda et al. | 502/209 |
| 4,621,155 | A * | 11/1986 | Ueshima et al. | 562/534 |
| 5,681,790 | A * | 10/1997 | Kim et al. | 502/164 |
| 6,458,740 | B2 * | 10/2002 | Kasuga et al. | 502/211 |
| 6,610,629 | B2 * | 8/2003 | Hinago et al. | 502/300 |
| 7,045,482 | B2 * | 5/2006 | Chun et al. | 502/208 |
| 7,625,834 | B2 * | 12/2009 | Naitou et al. | 502/208 |
| 2010/0069230 | A1 * | 3/2010 | Hwang et al. | 502/209 |

FOREIGN PATENT DOCUMENTS

| | | |
|---|---|---|
| KR | 93006683 B1 | 7/1993 |
| KR | 1020030003028 A | 1/2003 |
| KR | 1020030093654 A | 12/2003 |
| KR | 1020050073224 A | 7/2005 |

* cited by examiner

[Figure 1]
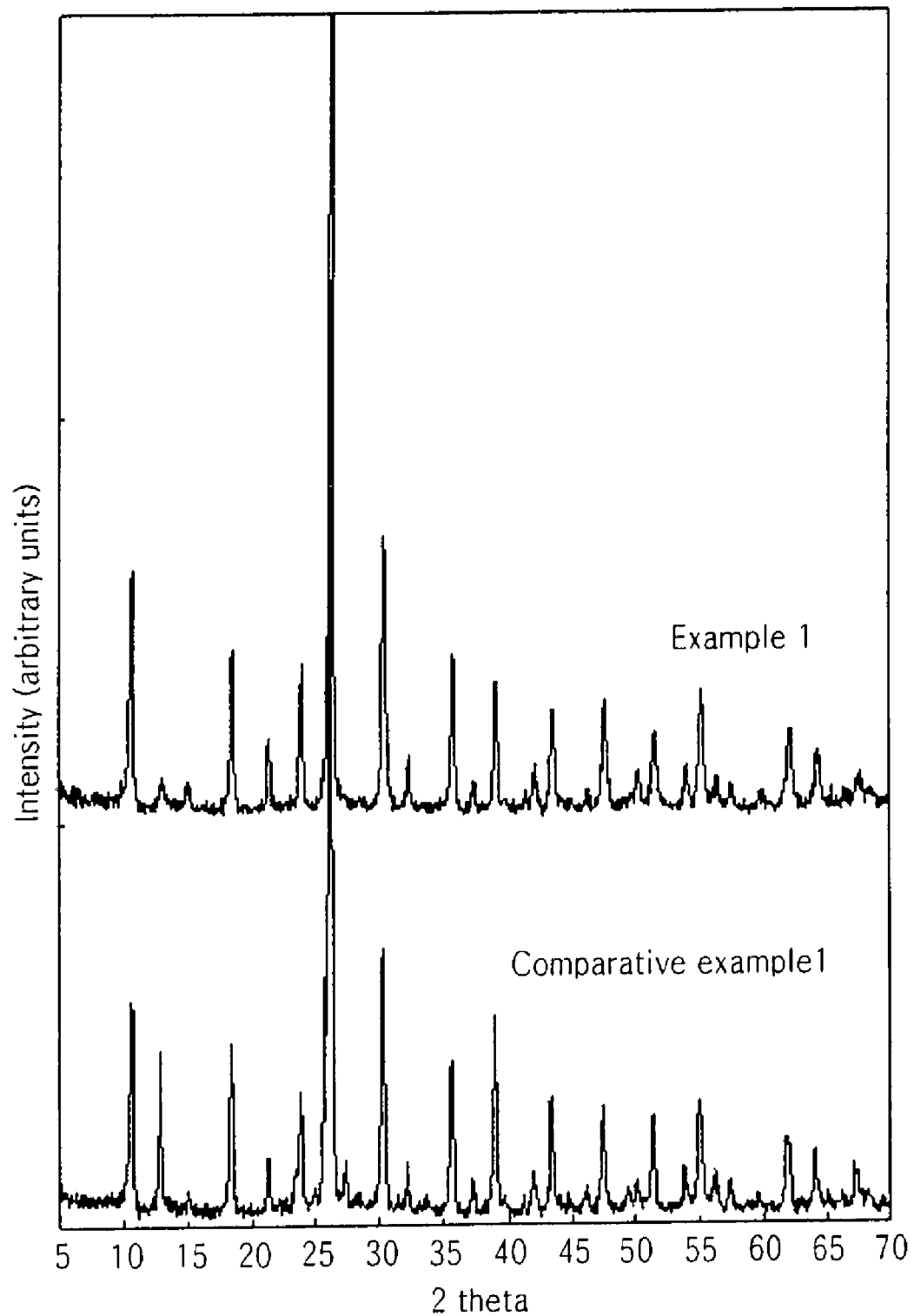

METHOD OF PREPARING HETEROPOLY ACID CATALYST

CROSS REFERENCE TO RELATED APPLICATIONS

This application is a 35 U.S.C. §371 National Phase Entry Application from PCT/KR2008/003313, filed Jun. 13, 2008, and designating the United States, which claims priority under 35 U.S.C. §119 to Korean Patent Application No. 10-2007-0057760 filed Jun. 13, 2007, which is incorporated herein in its entirety.

TECHNICAL FIELD

The present invention relates to a method of preparing a heteropoly acid catalyst, more precisely a method of preparing a heteropoly acid catalyst which is characterized by high methacrolein conversion rate and high methacrylic acid selectivity and does not require pre-firing process by using high purity protonic acid Keggin-type heteropoly acid and ammonium salt.

BACKGROUND ART

In the production of methacrylic acid by gas phase oxidation of methacrolein in the presence of a catalyst, the catalyst is generally a heteropoly acid catalyst.

U.S. Pat. No. 4,301,031 (registered on Nov. 17, 1981) describes that the catalyst produced from heteropoly acid slurry having the composition of $Mo_{12}P_{0.1-3}M_{0.1-3}Cu_{0.1-2}V_{0.1-2}X_{0.01-2}Y_aO_b$ (Wherein, M is K, Rb or Cs; X is Ba, La, Ga, Al, Ag, Cd, Ti, Tl, Hg, Pb or Zn; Y is Fe, Co, Ni, Sr, Mn, In, Ta, Ge, S or Be) by the processes of drying the slurry without using nitric acid, molding and firing is effective in oxidation of methacrolein.

U.S. Pat. No. 6,458,740B2 (registered on Oct. 1, 2002) describes a method of preparing a catalyst which comprises the steps of mixing ammonium paramolybdate and ammonium methavanadate with pyridine and 85% phosphoric acid; adding nitric acid, cesium nitrate and copper nitrate to the above mixture, followed by coprecipitation; heating and drying the mixture to give a catalyst.

U.S. Pat. No. 4,621,155 (registered on Nov. 4, 1986) describes that a catalyst prepared by using a material containing nitrogen such as pyridine, piperidine or piperazine has excellent plasticity and physical strength and reproducibility in catalyst production. But, to produce such a catalyst, pre-firing in the presence of nitrogen is necessary before air firing, in order to prevent structural disassembly by rapid heating during air firing, resulting in inefficiency.

Japanese Patent No. 3772389 (published on Nov. 25, 1997) describes a method of preparing a heteropoly acid catalyst from heteropoly acid produced from molybdenium oxide, vanadium oxide and phosphoric acid by the processes of mixing with ammonia water and zinc oxide, drying and firing thereof.

However, the catalysts prepared by the above methods have a problem of low conversion rate and low selectivity during gas phase oxidation of methacrolein, which needs to be improved.

DISCLOSURE OF INVENTION

It is an object of the present invention, to solve the above problems, to provide a method of preparing a heteropoly acid catalyst which is characterized by high methacrolein conversion rate and high methacrylic acid selectivity and does not require pre-firing process by using high purity protonic acid Keggin-type heteropoly acid and ammonium salt.

The above object and other objects of the present invention can be achieved by the following embodiments of the present invention.

To achieve the object of the invention, the present invention provides a method of preparing a heteropoly acid catalyst comprising the steps of preparing heteropoly acid slurry by adding ammonium salt along with metal precursors to protonic acid Keggin-type heteropoly acid aqueous solution and stirring the mixture; and drying the slurry, molding and firing thereof.

The present invention also provides a heteropoly acid catalyst prepared by the above method.

The present invention is described in detail hereinafter.

The present inventors found out that a heteropoly acid catalyst was produced with high methacrolein conversion rate and high methacrylic acid selectivity without pre-firing process when metal precursors and nitrogen containing materials such as ammonium salt were added to high purity protonic acid Keggin-type heteropoly acid aqueous solution in a necessary order, leading to the completion of this invention.

The method of preparing a heteropoly acid catalyst of the present invention characteristically comprises the following steps:

(A) preparing a slurry by adding i) one or more materials selected from the group consisting of precursors of Bi, As, Zr, Ge, Tl, Si, B, Te, Sb and Ta (referred as "X" hereinafter), ii) one or more materials selected from the group consisting of precursors of Ti, W, Fe, Cu, Zn, Cr, Co, Ni, Mn, Ga, Ce and La (referred as "Y" hereinafter), iii) one or more materials selected from the group consisting of precursors of K, Rb, Na, Cs, Mg and Ba (referred as "Z" hereinafter), and iv) ammonium salt to protonic acid Keggin-type heteropoly acid aqueous solution and stirring thereof; and (B) drying, molding and firing the slurry to give a catalyst.

The heteropoly acid catalyst prepared above is represented by the following formula 1.

Chemistry Figure 1

[Chem. 1]

Wherein, a is 0.01-3, b is 12, c is 0.01-3, d is 0.01-3, e is 0.001-2, f is 0.01-3, g is the number satisfying the atomic values of a, b, c, d, e, and f.

The heteropoly acid catalyst can include a small amount of ammonium remaining after firing.

The method of preparing a heteropoly acid catalyst of the present invention is described by the following step (A) and step (B).

(A) Preparation of Heteropoly Acid Slurry

The heteropoly acid slurry of the present invention is prepared by adding i) one or more materials selected from the group consisting of precursors of Bi, As, Zr, Ge, Tl, Si, B, Te, Sb and Ta (referred as "X" hereinafter), ii) one or more materials selected from the group consisting of precursors of Ti, W, Fe, Cu, Zn, Cr, Co, Ni, Mn, Ga, Ce and La (referred as "Y" hereinafter), iii) one or more materials selected from the group consisting of precursors of K, Rb, Na, Cs, Mg and Ba (referred as "Z" hereinafter), and iv) ammonium salt to protonic acid Keggin-type heteropoly acid aqueous solution and stirring thereof.

The protonic acid Keggin-type heteropoly acid can be produced by the following steps: a) preparing an aqueous solution by adding oxides of Mo and V, distilled water and $H_3PO_4$ to a reactor, stirring and dissolving thereof; b) preparing a concentrate by evaporating the aqueous solution under normal or reduced pressure; and c) stirring the concentrate.

The protonic acid herein indicates the acid that is ionized in water to release hydrogen ions ($H^+$).

The Keggin-type structure has phosphomolybdate as a main structure and additionally has Mo or vanadium oxide having octahedral structure around each phosphate which makes the 12 oxides shares the edge. At this time, in the Keggin-type 1 molecule, if the atomic number of Mo is 12-x, the number of V is x (x=0, 1, 2, 3).

The Keggin-type heteropoly acid in another form of protonic acid having different x value can be mixed.

The precursors of X, Y and Z can be oxides, hydroxides, chlorides, nitrates, sulfates, carbonates, hydrogen carbonates, fluorides, acetates or tartrates, and water-soluble compounds are more preferred.

The precursor of X can be an antimony (Sb) precursor. When Sb is included in the final heteropoly acid catalyst, oxidation state of the catalyst can be partially converted into reduction state, which increases methacrolein selectivity in gas phase oxidation.

The ammonium salt herein can be selected from the group consisting of ammonia water, ammonium chloride, ammonium nitrate, ammonium sulfate, ammonium carbonate, ammonium bicarbonate and ammonium acetate.

The content of the ammonium salt is 0.1-20 molecules for 12 Mo atoms, preferably 1-15 molecules. If the amount of the ammonium salt is less than 1 molecule or more than 15 molecules, the improvement of catalyst functions by the addition of the ammonium salt is hardly expected.

The X, Y and Z precursors and the ammonium salt can be directly added to the protonic acid Keggin-type heteropoly acid aqueous solution, or can be suspended or dissolved in water before addition. It is more advantageous to dissolve the precursors and the ammonium salt in water before addition. If it is prepared as one aqueous solution, there might be a problem of chemical precipitate with generating suspension. So, it is preferred to prepare at least two aqueous solutions.

The addition of the above X, Y and Z precursors and the ammonium salt can be executed at once or separately.

When the X, Y and Z precursor aqueous solutions and the ammonium salt aqueous solution are added to the protonic acid Keggin-type heteropoly acid aqueous solution, precipitation is occurred or suspension is formed. So, the precursor that generates a precipitate is preferably added later than the precursor maintaining at suspension phase.

When the ammonium salt is added to the protonic acid Keggin-type heteropoly acid aqueous solution, it produces a precipitate, so that it is preferred to add the ammonium salt later. Precisely, it is preferred to add the ammonium salt after adding the X precursor or together with the Z precursor or before adding the Z precursor.

The Y precursor can be added before, after or together with the addition of the X precursor, or after adding the Z precursor and the ammonium salt. The above addition order is important. According to that order, the slurry formation is accelerated and the catalyst capacity is improved.

The addition of the X, Y and Z precursor aqueous solutions and the ammonium salt aqueous solution to the protonic acid Keggin-type heteropoly acid aqueous solution is performed as follows: the heteropoly acid aqueous solution is loaded in the above precursor aqueous solution or the precursor aqueous solution is loaded in the heteropoly acid aqueous solution. The loading time is preferably 5 seconds-5 hours and the loading has to be slow.

In step (A), the stirring is preferably performed at 0-150° C. for 1-72 hours, more preferably at 30-100° C. for 1-48 hours.

(B) Preparation of a Heteropoly Acid Catalyst

The method of preparing a heteropoly acid catalyst of the present invention is composed the following steps: drying the heteropoly acid slurry prepared in step (A), molding and firing thereof.

The heteropoly acid slurry prepared in step (A) can be filtered, or evaporating a reaction solvent therefrom by oven-drying, stirring-drying or spray-drying to give powder.

The powder is dried more in an oven at 80-120° C. for 1-24 hours.

An additive such as silica, alumina, graphite, zeolite, silicon carbide or glass fiber and a solvent such as distilled water or an organic solvent can be added to the dried powder or the non-dried heteropoly acid slurry, followed by extruding in the shape of sphere, cylinder or ring and firing to give a heteropoly acid catalyst.

As for the firing herein, the above extrudate does not heat rapidly during firing, so pre-firing in the presence of nitrogen is not necessary. Instead, firing is preferably performed at 200-600° C. for 1-24 hours in the presence of air, oxygen or nitrogen. These conditions can improve the activity of a catalyst.

The heteropoly acid catalyst of the present invention is useful for the production of methacrylic acid by gas phase oxidation of methacrolein, isobutyric acid, isobutylaldehyde or isobutane, and is characteristically produced by the above method of the present invention.

Hereinafter, the method of preparing methacrylic acid by gas phase oxidation of methacrolein in the presence of the heteropoly acid catalyst is described in detail.

The methacrolein that is used as a raw material for gas phase oxidation can be purified before use or can be mixed gas obtained from oxidation of isobutylene, t-butylene, methal-t-butyl ether, etc.

The preferable content of the methacrolein in the total gas is up to 10%.

$O_2$, air, $N_2$, $CO_2$ or water vapor can be added for gas phase oxidation, and air containing oxygen is preferred in the economical aspect.

The addable gas contains 0.5-20% oxygen by methacrolein, preferably 1-10%, and 1-20% water vapor, preferably 1-15% by methacrolein. At this time, $N_2$ or $CO_2$ can be added as a balance gas.

The gas phase oxidation is preferably performed at 200-380° C., preferably at 250-340° C. with providing the total gas at space velocity of 100-2,000 $hr^{-1}$, preferably at 200-1,500 $hr^{-1}$.

BRIEF DESCRIPTION OF THE DRAWINGS

The application of the preferred embodiments of the present invention is best understood with reference to the accompanying drawings, wherein:

FIG. 1 is a graph illustrating the results of XRD analysis of the heteropoly acid catalysts prepared in Example 1 and Comparative Example 1.

BEST MODE FOR CARRYING OUT THE INVENTION

Practical and presently preferred embodiments of the present invention are illustrative as shown in the following Examples.

However, it will be appreciated that those skilled in the art, on consideration of this disclosure, may make modifications and improvements within the spirit and scope of the present invention.

EXAMPLES

Example 1

(A) Preparation of Heteropoly Acid Slurry 80 g of $H_3PMo_{12}O_{40} \cdot 30H_2O$ with at least 99% purity and 105 g of $H_4PMo_{11}V_1O_{40} \cdot 30H_2O$ (Nippon Inorganic Chemical) were added to a 5 L glass reactor, to which 450 ml of distilled water was added. After dissolving the mixture, temperature was raised to 80° C. The mixture was stirred at 700 rpm during which 7.52 g of $K(SbO)C_4H_4O_6 \cdot 0.5H_2O$ dissolved in 200 ml of distilled water, 4.4 g of $Ni(NO_3)_2 \cdot H_2O$ dissolved in 70 ml of distilled water, 12.94 g of $KNO_3$ dissolved in 100 ml of distilled water and 24 g of $NH_4NO_3$ dissolved in 200 ml of distilled water were loaded stepwise (loading speed: 10 ml/min). The mixture was stirred for approximately 12 hours under the same conditions to give heteropoly acid slurry.

(B) Preparation of Heteropoly Acid Catalyst

The heteropoly acid slurry prepared in step (A) was dried in a 120° C. oven for 24 hours to give powder. Glass fiber (5 weight % by the total powder content) and a small amount of ethanol were added to the powder, followed by extruding into 5×5 mm. Air firing was performed at 400° C. for 3 hours to give the final heteropoly acid catalyst represented by the formula $P_{1.1}Mo_{12}V_{0.6}Sb_{0.3}Ni_{0.2}K_{1.7}P1.1$ (oxygen and minute amount of ammonium remaining in the catalyst were not presented in the formula).

Example 2

(A) Preparation of Heteropoly Acid Slurry 206.5 g of $H_3PMo_{12}O_{40} \cdot 0H_2O$ with at least 99% purity and 187.9 g of $H_4PMo_{11}V_1O_{40} \cdot 0H_2O$ (Nippon Inorganic Chemical) were added to a 5 L glass reactor, to which 1,000 ml of distilled water was added for dissolving. Then, the temperature was maintained at 30° C. The mixture was stirred at 700 rpm, during which 6.95 g of $Bi(NO3)3 \cdot H2O$ and 7.7 g of $Fe(NO_3)_3 \cdot 9H_2O$ dissolved in 60 ml of distilled water were loaded for 10 minutes. Then, 26.45 g of $Cs_2CO_3$ and 45.9 g of $(NH_4)_2CO_3$ dissolved in 300 ml of distilled water were loaded thereto for 30 minutes. The mixture was stirred for approximately 20 hours under the same conditions to give heteropoly acid slurry.

(B) Preparation of Heteropoly Acid Catalyst

The heteropoly acid slurry prepared in step (A) was dried in a 120° C. oven for 24 hours to give powder. Glass fiber (5 weight % by the total powder content) and a small amount of distilled water were added to the powder, followed by extruding into 5×5 mm. Air firing was performed at 400° C. for 3 hours to give the final heteropoly acid catalyst represented by the formula $P_{1.1}Mo_{12}V_{0.5}Bi_{0.15}Fe_{0.2}Cs_{1.0}$ (minute amount of ammonium remaining in the catalyst was not presented in the formula).

Comparative Example 1

An experiment was performed by the same manner as described in Example 1 except that 19.8 g of pyridine was added instead of 24 g of $-NH_4NO_3-$ to give the catalyst represented by the formula $P_{1.1}Mo_{12}V_{0.6}Sb_{0.3}Ni_{0.2}K_{1.7}$.

During the air firing, a rapid exothermic peak was observed at about 300° C. in the middle of raising temperature, confirmed by monitoring the surface temperature of the catalyst. The surface temperature of the catalyst at the point of the rapid exothermic peak was approximately 500° C.

Comparative Example 2

330 g of $MoO_3$, 10.4 g of $V_2O_5$, 26.4 g of 85% $H_3PO_4$ and 2.4 L of distilled water were added to a 5 L glass reactor, followed by stirring at 90° C. for 12 hours at 500 rpm. The reaction mixture was completely dissolved to give a clear aqueous solution. The aqueous solution was evaporated under normal pressure at 90° C. for 7 hours, leading to the concentration of the solution into 600 ml. The concentrate was stirred for 18 hours, followed by distillation under reduced pressure to give solid heteropoly acid. From 31P NMR analysis, it was confirmed that the solid heteropoly acid had Keggin-type structure (approximately 80 mol %) and Dawson structure (approximately 20 mol %).

185 g of the solid heteropoly acid was put in a 5 L reactor. The heteropoly acid catalyst represented by the formula $P_{1.1}Mo_{12}V_{0.6}Sb_{0.3}Ni_{0.2}K_{1.7}$ was produced by the same manner as described in Example 1.

Comparative Example 3

An experiment was performed by the same manner as described in Comparative Example 1 except that pre-firing was performed in the presence of nitrogen at 370° C. for 3 hours before the air firing of Comparative Example 1. During the temperature raising process of the air firing, the rapid exothermal peak observed in Comparative Example 1 was not detected herein.

Comparative Example 4

The heteropoly acid slurry was prepared by the same manner as described in Example 1 except that $(NH_4)_2CO_3$ was not added in step (A) of Example 1, and dried powder was obtained therefrom. However, during the powder extruding, the catalyst was confirmed not as good as a commercial catalyst.

Experimental Example

Heteropoly acid catalysts prepared in Examples 1-2 and Comparative Example 1 were used for gas phase oxidation of methacrolein.

A stainless reactor was filled with the heteropoly acid catalyst, followed by gas phase oxidation with the gas containing the raw material methacrolein (3.3%), molecular oxygen (8.7%) and water vapor (10.5%) in the presence of nitrogen as a balance gas at 300° C. at the space velocity of 900 $hr^{-1}$.

The methacrolein conversion rate and methacrylic acid selectivity were measured by mathematical formulas 1 and 2 and the results are shown in Table 1.

Math Figure 1

$$\text{Methacrolein conversion rate}(\%) = [\text{mol number of reacted methacrolein/mol number of supplied methacrolein}] \times 100 \quad [\text{Math. 1}]$$

Math Figure 2

$$\text{Methacrylic acid selectivity}(\%) = [\text{mol number of generated methacrylic acid/mol number of reacted methacrolein}] \times 100 \quad [\text{Math. 2}]$$

TABLE 1

|  | Methacrolein conversion rate (%) | Methacrylic acid selectivity (%) | Methacrylic acid yield (%) |
| --- | --- | --- | --- |
| Example 1 | 84.2 | 78.6 | 66.1 |
| Example 2 | 85.1 | 73.4 | 62.4 |
| Comparative Example 1 | 88.5 | 59.3 | 52.4 |
| Comparative Example 2 | 76.3 | 73.2 | 55.8 |
| Comparative Example 3 | 73.1 | 64.2 | 46.9 |

As shown in Table 1, the heteropoly acid catalysts prepared in Examples 1 and 2 in which ammonium salt was added in the late stage showed similar methacrolein conversion rate to that of the heteropoly acid catalyst prepared in Comparative Example 1 in which pyridine was added in the late stage, but the catalysts of Examples 1 and 2 exhibited significantly high methacrylic acid selectivity. The heteropoly acid catalyst prepared in Comparative Example 3 with the addition of the step of pre-firing exhibited a little increased methacrylic acid selectivity compared with that of Comparative Example 1 but far behind that of the heteropoly acid catalyst of the present invention.

The heteropoly acid catalysts of Examples 1 and 2 prepared by using high purity Keggin-type heteropoly acid demonstrated significantly high methacrolein conversion rate and methacrylic acid selectivity, compared with the heteropoly acid catalyst of Comparative Example 2 prepared by using Keggin-type heteropoly acid containing partly Dawson type heteropoly acid.

The catalysts prepared in Example 1 and Comparative Example 1 were analyzed by XRD and the results are shown in FIG. 1. As shown in FIG. 1, the catalyst of Example 1 showed significantly low level of phase (13°, 22°, 27°, etc) corresponding $MoO_3$, the impurity reducing catalytic properties. The impurity $MoO_3$ was generated by a partial collapse of heteropoly acid structure by a rapid heat during air-firing.

INDUSTRIAL APPLICABILITY

As explained hereinbefore, the present invention provides a method of preparing a heteropoly acid catalyst which is characterized by high methacrolein conversion rate and high methacrylic acid selectivity and does not require pre-firing process by using high purity protonic acid Keggin-type heteropoly acid and ammonium salt.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

The invention claimed is:

1. A method of preparing a heteropoly acid catalyst comprising the following steps:
    (A) preparing a slurry by adding i) one or more materials selected from the group consisting of precursors of Bi, As, Zr, Ge, Tl, Si, B, Te, Sb and Ta (referred as "X" hereinafter), ii) one or more materials selected from the group consisting of precursors of Ti, W, Fe, Cu, Zn, Cr, Co, Ni, Mn, Ga, Ce and La (referred as "Y" hereinafter), iii) one or more materials selected from the group consisting of precursors of K, Rb, Na, Cs, Mg and Ba (referred as "Z" hereinafter), and iv) ammonium salt to protonic acid Keggin-type heteropoly acid aqueous solution and stirring thereof;
    wherein the X, Y, and Z precursors and the ammonium salt are added as precursor aqueous solutions,
    wherein precursor aqueous solutions maintaining the slurry at suspension phase are added first and a precursor aqueous solution that generates a precipitate is added only after addition of precursor aqueous solutions maintaining the slurry at suspension phase, and
    wherein the ammonium salt is added finally; and
    (B) drying, molding and firing the slurry to give a heteropoly acid catalyst.

2. The method of preparing a heteropoly acid catalyst according to claim 1, wherein the heteropoly acid catalyst is represented by the following formula 1:

$P_aMo_bV_cX_dY_eZ_fO_g$      [Chemistry Figure 1]

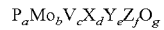

wherein, a is 0.01-3, b is 12, c is 0.01-3, d is 0.01-3, e is 0.001-2, f is 0.01-3, g is the number satisfying the atomic values of a, b, c, d, e, and f.

3. The method of preparing a heteropoly acid catalyst according to claim 2, wherein the X in formula 1 is antimony (Sb).

4. The method of preparing a heteropoly acid catalyst according to claim 1, wherein the protonic acid Keggin-type heteropoly acid is produced by using oxides of Mo and V, distilled water, and $H_3PO_4$.

5. The method of preparing a heteropoly acid catalyst according to claim 1, wherein the X precursor is an antimony (Sb) precursor.

6. The method of preparing a heteropoly acid catalyst according to claim 1, wherein the X precursor is added before adding the Z precursor and the ammonium salt.

7. The method of preparing a heteropoly acid catalyst according to claim 1, wherein the ammonium salt is selected from the group consisting of ammonia water, ammonium chloride, ammonium nitrate, ammonium carbonate, ammonium bicarbonate, ammonium acetate and ammonium sulfate.

8. The method of preparing a heteropoly acid catalyst according to claim 1, wherein the ammonium salt is added by 1-15 molecules for 12 atoms of Mo.

9. The method of preparing a heteropoly acid catalyst according to claim 1, wherein the step (A) is performed by the stirring at 0-150° C. for 1-24 hours.

10. The method of preparing a heteropoly acid catalyst according to claim 1, wherein the step (B) is composed of the following steps: drying the separated slurry in the oven at 80-120° C. for 1-24 hours and firing thereof in the presence of air, oxygen or nitrogen at 200-600° C. for 1-24 hours.

11. A heteropoly acid catalyst prepared by the method of claim 1 and used for the production of methacrylic acid by gas phase oxidation of methacrolein, isobutylic acid, isobutyl aldehyde or isobutane.

* * * * *